(12) United States Patent
Doud et al.

(10) Patent No.: US 11,053,169 B2
(45) Date of Patent: Jul. 6, 2021

(54) SYNTACTIC INSULATOR WITH CO-SHRINKING FILLERS

(71) Applicant: POWDERMET, INC., Euclid, OH (US)

(72) Inventors: Brian P. Doud, Cleveland Heights, OH (US); Mark V. Grogan, Cleveland, OH (US); Andrew Sherman, Mentor, OH (US)

(73) Assignee: Powdermet, Inc., Euclid, OH (US)

( * ) Notice: Subject to any disclaimer, the term of this patent is extended or adjusted under 35 U.S.C. 154(b) by 348 days.

(21) Appl. No.: 16/257,187

(22) Filed: Jan. 25, 2019

(65) Prior Publication Data

US 2019/0152868 A1 May 23, 2019

Related U.S. Application Data

(60) Division of application No. 15/609,165, filed on May 31, 2017, now Pat. No. 10,787,394, which is a continuation-in-part of application No. 14/073,064, filed on Nov. 6, 2013, now abandoned.

(60) Provisional application No. 61/723,542, filed on Nov. 7, 2012.

(51) Int. Cl.
| | |
|---|---|
| *C08J 9/32* | (2006.01) |
| *C04B 38/06* | (2006.01) |
| *C04B 38/00* | (2006.01) |
| *C04B 35/524* | (2006.01) |
| *F16L 59/14* | (2006.01) |
| *C04B 38/08* | (2006.01) |
| *C04B 35/80* | (2006.01) |
| *F16L 59/02* | (2006.01) |
| *C04B 35/571* | (2006.01) |
| *C04B 35/58* | (2006.01) |
| *C04B 35/515* | (2006.01) |
| *C08J 9/35* | (2006.01) |
| *C08K 7/22* | (2006.01) |
| *C08K 7/24* | (2006.01) |
| *C04B 111/28* | (2006.01) |

(52) U.S. Cl.
CPC ......... *C04B 38/007* (2013.01); *C04B 35/515* (2013.01); *C04B 35/524* (2013.01); *C04B 35/571* (2013.01); *C04B 35/58* (2013.01); *C04B 35/806* (2013.01); *C04B 38/0645* (2013.01); *C04B 38/08* (2013.01); *C08J 9/32* (2013.01); *C08J 9/35* (2013.01); *C08K 7/22* (2013.01); *C08K 7/24* (2013.01); *F16L 59/028* (2013.01); *F16L 59/145* (2013.01); *C04B 2111/28* (2013.01); *C04B 2235/3217* (2013.01); *C04B 2235/3821* (2013.01); *C04B 2235/3826* (2013.01); *C04B 2235/483* (2013.01); *C04B 2235/528* (2013.01); *C04B 2235/5436* (2013.01); *C04B 2235/608* (2013.01); *C04B 2235/77* (2013.01); *C04B 2235/9607* (2013.01)

(58) Field of Classification Search
CPC ... C04B 35/515; C04B 35/524; C04B 35/571; C04B 35/58; C04B 38/007; C04B 38/0645; C04B 38/08; C04B 2111/28; C04B 2235/3217; C04B 2235/3821; C04B 2235/3826; C04B 2235/483; C04B 2235/528; C04B 2235/5436; C04B 2235/608; C04B 2235/77; C04B 2235/9607; C08J 9/32; C08J 9/35; C08K 7/22; C08K 7/24; F16L 59/028; F16L 59/145

See application file for complete search history.

(56) References Cited

U.S. PATENT DOCUMENTS

| | | | |
|---|---|---|---|
| 5,508,072 A * | 4/1996 | Andersen | B01F 3/1214 428/34.5 |
| 2003/0121455 A1* | 7/2003 | Hermansson | C04B 7/02 106/692 |
| 2004/0058201 A1 | 3/2004 | Merrill | |
| 2005/0012233 A1* | 1/2005 | Kim | C04B 35/5611 264/43 |
| 2007/0098973 A1* | 5/2007 | Wagner | C08J 9/0085 428/292.1 |

FOREIGN PATENT DOCUMENTS

| | | | |
|---|---|---|---|
| WO | 2013123584 | 8/2013 | |
| WO | WO-2013123584 A1 * | 8/2013 | ....... C04B 35/63424 |

* cited by examiner

*Primary Examiner* — John M Cooney
(74) *Attorney, Agent, or Firm* — Ulmer & Berne LLP; Brian Turung; Eric Robbins

(57) ABSTRACT

A thermally-insulating composite material with co-shrinkage in the form of an insulating material formed by the inclusion of microballoons in a matrix material such that the microballoons and the matrix material exhibit co-shrinkage upon processing. The thermally-insulating composite material can be formed by a variety of microballoon-matrix material combinations such as polymer microballoons in a preceramic matrix material. The matrix materials generally contain fine rigid fillers.

33 Claims, 1 Drawing Sheet

SYNTACTIC INSULATOR WITH CO-SHRINKING FILLERS

The present invention is a divisional of U.S. application Ser. No. 15/609,165 filed May 31, 2017, which in turn is a continuation-in-part of U.S. application Ser. No. 14/073,064 filed Nov. 6, 2013 (abandoned), which in turn claims priority on U.S. Provisional Patent Application Ser. No. 61/723,542, filed Nov. 7, 2012, which are both incorporated herein by reference.

STATEMENT REGARDING FEDERALLY-SPONSORED RESEARCH OR DEVELOPMENT

Portions of this work were conducted under federally-sponsored research, including NASA SBIR contract NNX11OE65P.

FIELD OF INVENTION

The present invention is in the technical field of high temperature composite materials. More particularly, the present invention is in the technical field of structural, thermally-insulating composite materials. Still more particularly, the present invention is in the technical field of structural, thermally-insulating composite materials at least partially derived from preceramic polymers and reactive materials. Yet more particularly, the present invention is in the technical field of structural, thermally-insulating composite materials at least partially derived from preceramic polymers and reactive materials, which thermally-insulating composite materials incorporate hollow and/or shrinkable fillers.

BACKGROUND OF THE INVENTION

Evolving requirements for dimensionally-stable high temperature structures are driven by increased needs for speed and mobility in aerospace systems. Current insulators have limitations with regard to temperature and strength limits of low density insulator systems, poor thermal shock resistance and high density of ceramic systems including monolithic oxides and ceramic matrix composite materials, and lack of dimensional stability and high density of phenolic or other polymer-based composite insulators. The current invention enables the production of a low density, high temperature structural insulator suitable for use in rocket motors and reentry vehicles, as well as metal processing and other high temperature applications.

SUMMARY OF THE INVENTION

The present invention is directed to structural, thermally-insulating composite materials. In one non-limiting embodiment of the invention, the present invention is directed to structural, thermally-insulating composite materials formed of a matrix material that includes a pore-forming filler material that can be formed of hollow and/or shrinkable fillers. The structural, thermally-insulating composite materials are generally a high strength composite insulator that protects against high temperatures and can be used in high stress environments up to and exceeding 1600° C.; however, this is not required. The pore-forming filler material can include materials that are specially designed hollow spherical fillers that co-shrink with a preceramic polymer matrix material to lower or eliminate stress during sintering, pyrolization, and/or curing. These pore-forming filler materials can form pores in the formed composite material. The pore-forming filler materials generally constitutes at least about 1 vol. % of the thermally-insulating composite material, and can constitute up to about 74 vol. % of the thermally-insulating composite material (and all values and ranges therebetween). In one non-limiting embodiment, the pore-forming filler materials generally constitute at least about 20 vol. % of the thermally-insulating composite material, and typically at least about 30 vol. % of the thermally-insulating composite material.

In one non-limiting aspect of the present invention, the thermally-insulating composite material include a plurality of matrix pores formed from the pore-forming filler material, which matrix pores are distributed in a matrix material. The matrix pores can be evenly or non-evenly distributed in the matrix material. The matrix pores are generally distributed throughout the matrix material and have a low thermal conductivity. As such, when the pores are distributed in the matrix material, the overall thermal conductivity of the thermally-insulating composite material is lower than the thermal conductivity of the matrix material. Generally, the thermal conductivity of the matrix pores (e.g., microspheres, etc.) is less than the matrix material (e.g., polymer, etc.). Generally, the plurality of matrix pores in the matrix material exhibit co-shrinkage upon processing at elevated temperatures. This co-shrinkage can reduce post-processing stresses within the thermally-insulating composite material.

In another and/or alternative non-limiting aspect of the present invention, the thermally-insulating composite material can have varying degrees of size, loading, and/or distribution of the matrix pores. The size of the one or more matrix pores in the thermally-insulating composite material is non-limiting. In one non-limiting embodiment, the matrix pore size can range from several nanometers to hundreds of microns (e.g., 3 nm to 500 μm and all values and ranges therebetween). In another and/or alternative non-limiting embodiment of the present invention, the matrix pore loading in the matrix material can range from less than 1 vol. % to up to about 74 vol. % (e.g., 0.1 vol. % to 74 vol. % and all values and ranges therebetween). The upper limit of about 74 vol. % of the matrix pore is the maximum achievable volume for a closed-cell porous system that can be successfully used in the present invention. In one non-limiting specific configuration, the matrix pore loading in the matrix material is at least about 5 vol. % of said thermally-insulating composite material. In another non-limiting specific configuration, the matrix pore loading in the matrix material is at least about 25 vol. % of said thermally-insulating composite material. In another non-limiting specific configuration, the matrix pore loading in the matrix material is at least about 40 vol. % of said thermally-insulating composite material. In another non-limiting specific configuration, the pore loading in the matrix material is over 50 vol. % of said thermally-insulating composite material. In another non-limiting specific configuration, the matrix pore loading in the matrix material is at least about 60 vol. % of said thermally-insulating composite material. In still another and/or alternative non-limiting embodiment of the present invention, the distribution of matrix pores in the matrix material can be random, gradient, and/or uniform. In one non-limiting specific configuration, the distribution of pores in the matrix material is generally uniform.

In still another and/or alternative non-limiting aspect of the present invention, the thermally-insulating composite material can include a matrix material at least partially formed of polymer, ceramic, metal and/or any other sufficiently rigid and strong material; however, this is not required. The matrix material can also or alternatively be formed from a precursor material that converts to a solid polymer, ceramic, and/or metal matrix system upon curing, pyrolization, carbonization and/or any other reaction mechanism. The matrix material generally constitutes at least about 20 vol. % of the thermally-insulating composite material, and can constitute up to about 99 vol. % of the thermally-insulating composite material (and all values and ranges therebetween). In one non-limiting embodiment, the matrix material generally constitutes at least about 40 vol. % of the thermally-insulating composite material, and typically at least about 50 vol. % of the thermally-insulating composite material.

In still another and/or alternative non-limiting aspect of the present invention, the thermally-insulating composite material can optionally include non-shrinkable fillers in the form of fibers, nanofibers, and/or other toughening and strengthening reinforcements; however, this is not required. When non-shrinkable fillers are optionally added to the thermally-insulating composite material, the thermally-insulating composite material can constitute about 0.05 vol. % to 45 vol. % (and all values and ranges therebetween) of the thermally-insulating composite material. In one non-limiting embodiment, the non-shrinkable fillers generally constitute at least about 5 vol. % of the thermally-insulating composite material, typically at least about 10 vol. % of the thermally-insulating composite material, and more typically at least about 20 vol. % of the thermally-insulating composite material.

The non-shrinkable fillers can include one or more materials selected from the group consisting of fumed silica, silica, glass fibers, carbon fibers, carbon nanotubes, SiC, $B_4C$, and other finely divided inorganic material. The non-shrlinkable fillers can include one or more materials selected from the group consisting of fumed silica, silica, glass fibers, carbon fibers, carbon nanotubes and other finely divided inorganic material.

In still yet another and/or alternative non-limiting aspect of the present invention, the pore-forming filler material can be formed of microballoons of ceramic, metal, polymer, aerogel, and/or any material that exhibits co-shrinkage with the matrix material throughout processing; however, this is not required. The one or more matrix pores formed from pore-forming filler material generally provide high strength and/or low thermal conductivity; however, this is not required. One or more of the matric pores can optionally be entirely hollow and/or be formed by the inclusion and degradation of a ceramic, metal, polymer, and/or any material that degrades at high temperatures leaving closed-cell porosity; however, this is not required.

In yet another and/or alternative aspect of the present invention, there is provided a material and a method of manufacturing a material that comprises a thermally-insulating, syntactic composite material that includes a plurality of matrix pores that are formed from pore-forming filler material, and which matrix pores are or include low-density microspheres in a polymer-derived matrix material that exhibits co-shrinkage between the microspheres and polymer-derived matrix during processing. One or more matrix pores formed of microspheres can optionally include shrinkable hollow microballoons and/or shrinkable low-density aerogel particles. One or more matrix pores in the form of the shrinkable microspheres can include a preceramic polymer microballoon, phenolic resin microballoon, green or partially-cured aerogel, and/or a sinterable ceramic microballoon. The matrix material can optionally be a thermosetting preceramic polymer. The matrix material can be engineered to have lower shrinkage than the pore-forming filler material such that it can be placed in compression upon curing; however, this is not required. The matrix material can be optionally engineered to have the same shrinkage as the pore-forming filler material so as to have close to zero residual stress after curing and pyrolization; however, this is not required. The pore-forming filler material can have some shrinkage; however, this is not required. Any shrinkage is generally less than the matrix material so as to restrain the shrinkage of the matrix phase that is formed by the matrix material in the thermally-insulating, syntactic composite material; however, this is not required. One non-limiting method for manufacturing a material that comprises a thermally-insulating, syntactic composite material formed from a thermally-insulating, syntactic composite material that includes low density microspheres in a polymer-derived matrix material that exhibits co-shrinkage between the microspheres and polymer-derived matrix during processing can include the non-limiting steps of: a) mixing shrinkable/curable microspheres and a thermosetting, curable polymer; b) molding and/or forming the mixed microspheres and polymer into a shape; and c) subsequently heat curing and pyrolization of the polymer material(s) to form the syntactic ceramic composite. The syntactic ceramic composite can optionally be subsequently processed with successive polymer impregnations and/or pyrolizations to increase density and/or strength. The syntactic ceramic composite can optionally undergo a stabilizing heat at or above the required operating temperatures. The method can optionally include the step of a non-shrinkable filler being added to thermally-insulating, syntactic composite material control shrinkage in the matrix phase. The non-shrinkable filler can optionally include fine rigid fiber fillers. Such fiber fillers generally have a principle dimension of at least about 2 times (i.e., 2×) smaller than the average diameter of the matrix pores (i.e., microspheres), typically at least about 5 times (i.e., 5×) smaller than the average diameter of the matrix pores, more typically at least about 10 times (i.e., 10×) smaller than the average diameter of the matrix pores, still more typically at least about 15 times (i.e., 15×) smaller than the average diameter of the matrix pores, and yet still more typically at least about 20 times (i.e., 20×) smaller than the average diameter of the matrix pores. The non-shrinkable filler can include, but is not limited to, ceramic particles and fibers, whiskers, or nanotubes. Generally, the non-shrinkable filler is used to control shrinkage in the matrix phase and/or to increase toughness of the thermally-insulating, syntactic composite material. The non-shrinkable filler can also be used to provide increased strength. The non-shrinkable filler can optionally have at least one primary dimension (e.g., length) of less than the average matrix pore diameter (e.g., diameter of microsphere) in the thermally-insulating, syntactic composite material. In one non-limiting arrangement, the average height of the non-shrinkable filler is less than average the matrix pore diameter. In another non-limiting arrangement, the average length of the non-shrinkable filler is no more than about 90% of the average matrix pore diameter. In another non-limiting arrangement, the average length of the non-shrinkable filler is no more than about 80% of the average matrix pore diameter. In another non-limiting arrangement, the average length of the non-shrinkable filler is no more than about 60% of the average matrix pore diameter. In another non-limiting arrangement, the average length of the non-shrinkable filler non-shrinkable filler is no more than about 50% of the average matrix pore diameter.

In another non-limiting arrangement, the average length of the non-shrinkable filler is no more than about 30% of the average matrix pore diameter. In another non-limiting arrangement, the average length of the non-shrinkable filler is no more than about 20% of the average matrix pore diameter. In another non-limiting arrangement, the average length of the non-shrinkable filler is no more than about 5% of the average matrix pore diameter.

Non-limiting advantages of the present invention include: 1) the ability to produce a closed-cell porous material with co-shrinkage between the pore-forming filler material and the matrix material; and 2) the ability to produce a closed-cell porous material with co-shrinkage between the pore-forming filler material and matrix material which may optionally include non-shrinkable filler, such as, but not limited to, fibers in the matrix material. These advantages and others can be achieved through the use of one or more pore-forming filler materials that are at least partially formed of a polymer microballoon and/or any other microballoon or material that exhibits co-shrinkage with the matrix precursor upon processing. Current state of the art does not achieve this co-shrinkage, thus leading to stress buildup in the material and overall loss of strength. The present invention instead retains its strength and/or structural integrity throughout processing.

In summary, there is provided one non-limiting method of manufacturing of a thermally-insulating, syntactic composite material that includes one or more pore-forming filler materials that can include low density microspheres in a polymer-derived matrix material that exhibits co-shrinkage between the microspheres and polymer-derived matrix during processing, which method includes: a) mixing the shrinkable/curable microspheres and a thermosetting, curable polymer; b) molding or forming the mixed microspheres and polymer into a shape; and, c) subsequent heat curing and pyrolization of the polymer material(s) to form a syntactic ceramic composite. The syntactic ceramic composite can optionally be subsequently processed with successive polymer impregnations and/or pyrolizations to increase density and/or strength. The syntactic ceramic composite can optionally undergo a stabilizing heat at or above the required operating temperatures. The syntactic ceramic composite can optionally include a non-shrinkable filler to control matrix shrinkage. The syntactic ceramic composite can optionally include non-shrinkable filler such as fibrous materials to provide higher strength and/or toughness. The syntactic ceramic composite can optionally be engineered so that the matrix material has a lower shrinkage than the syntactic filler such that it is placed in compression upon curing. The syntactic ceramic composite can optionally be engineered so that the matrix material has the same shrinkage as the syntactic filler so as to be close to zero residual stress after curing and pyrolization. The syntactic ceramic composite can optionally include syntactic filler that has some shrinkage, but it is less than the shrinkage of the matrix material so as to restrain the shrinkage of the matrix phase.

It is one non-limiting object of the present invention to provide an improved structural, thermally-insulating composite material.

It is another and/or alternative non-limiting object of the present invention to provide a structural, thermally-insulating composite material that is at least partially derived from preceramic polymers and reactive materials.

It is still another and/or alternative non-limiting object of the present invention to provide a structural, thermally-insulating composite material that incorporates one or more pore-forming filler materials.

It is yet another and/or alternative non-limiting object of the present invention to provide a structural, thermally-insulating composite material that protects against high temperatures and can be used in high-stress environments up to and exceeding 1600° C.

It is still yet another and/or alternative non-limiting object of the present invention to provide a structural, thermally-insulating composite material that includes pore-forming filler materials that includes hollow spherical fillers that co-shrink with a preceramic polymer matrix material to lower or eliminate stress during sintering, pyrolization, and/or curing.

It is another and/or alternative non-limiting object of the present invention to provide a structural, thermally-insulating composite material with matrix pores distributed in a matrix material, which matrix pores can be evenly or non-evenly distributed in the matrix material.

It is still another and/or alternative non-limiting object of the present invention to provide a structural, thermally-insulating composite material that includes matrix pores that have a low thermal conductivity.

It is yet another and/or alternative non-limiting object of the present invention to provide a structural, thermally-insulating composite material that has an overall thermal conductivity that is lower than the thermal conductivity of the matrix material.

It is still yet another and/or alternative non-limiting object of the present invention to provide a structural, thermally-insulating composite material that includes matrix pores in the matrix material that exhibit co-shrinkage upon processing at elevated temperatures.

It is another and/or alternative non-limiting object of the present invention to provide a structural, thermally-insulating composite material that has varying degrees of size, loading, and/or distribution.

It is still another and/or alternative non-limiting object of the present invention to provide a structural, thermally-insulating composite material that has matrix pore loading in the matrix material that ranges from less than 1 vol. % to up to about 74 vol. %.

It is yet another and/or alternative non-limiting object of the present invention to provide a structural, thermally-insulating composite material that has a matrix pore distribution in the matrix material that is random, gradient, or uniform.

It is still yet another and/or alternative non-limiting object of the present invention to provide a structural, thermally-insulating composite material that includes a matrix material that is at least partially formed of polymer, ceramic, metal and/or any other sufficiently rigid and strong material.

It is another and/or alternative non-limiting object of the present invention to provide a structural, thermally-insulating composite material wherein the matrix material can be at least partially formed from a precursor material that converts to a solid polymer, ceramic, and/or metal matrix system upon curing, pyrolization, carbonization and/or any other reaction mechanism.

It is still another and/or alternative non-limiting object of the present invention to provide a structural, thermally-insulating composite material that optionally includes a non-shrinkable filler such as, but not limited to, fibers, nanofibers, and/or other toughening and/or strengthening reinforcement.

It is yet another and/or alternative non-limiting object of the present invention to provide a structural, thermally-insulating composite material that includes one or more matrix pores in the form of microballoons of ceramic, metal, polymer, aerogel, alumina microspheres, shrinkable low-density aerogel particles, and/or any material that exhibits co-shrinkage with the matrix material throughout processing.

It is yet another and/or alternative non-limiting object of the present invention to provide a structural, thermally-insulating composite material that includes one or more matrix pores in the form of microspheres selected from the group consisting of a preceramic polymer microballoon, phenolic resin microballoon, green or partially-cured aerogel, and a sinterable ceramic microballoon.

It is still yet another and/or alternative non-limiting object of the present invention to provide a structural, thermally-insulating composite material that includes one or more matrix pores in the matrix material that provide high strength and/or low thermal conductivity.

It is another and/or alternative non-limiting object of the present invention to provide a structural, thermally-insulating composite material that includes one or more of the matrix pores that are entirely hollow and/or are formed by the inclusion and degradation of a ceramic, metal, polymer, and/or any material that degrades at high temperatures leaving closed-cell porosity.

It is still another and/or alternative non-limiting object of the present invention to provide a structural, thermally-insulating composite material wherein the non-shrinkable filler in the matrix material has a primary dimension (e.g., height, width) that is less than the matrix pore diameter (e.g., diameter of microsphere).

It is yet another and/or alternative non-limiting object of the present invention to provide a structural, thermally-insulating composite material that has the ability to produce a closed-cell porous material with co-shrinkage between the pore-forming filler material and matrix material, and the ability to produce a closed-cell porous material with co-shrinkage between the pore-forming filler material and matrix material which may optionally include non-shrinkable filler such as fibers in the matrix material.

It is still yet another and/or alternative non-limiting object of the present invention to provide a structural, thermally-insulating composite material that retains its strength and/or structural integrity throughout processing.

It is another and/or alternative non-limiting object of the present invention to provide a structural, thermally-insulating composite material that contains fine rigid non-shrinkable filler with a principle dimension that is smaller than the average size of the matrix pores, and where such non-shrinkable fillers can optionally include ceramic particles and fibers, whiskers, or nanotubes, and in which such non-shrinkable fillers can optionally be used to control shrinkage and increase toughness of the structural, thermally-insulating composite materials.

It is another and/or alternative non-limiting object of the present invention to provide a structural, thermally-insulating composite material that has a density below about 1.5 g/cc and a flexure and compressive strength exceeding about 5000 psig, more particularly has a density below about 1 g/cc, and a flexure and compressive strength exceeding about 10,000 psig.

It is another and/or alternative non-limiting object of the present invention to provide a structural, thermally-insulating composite material that has a thermal conductivity of less than about 0.6 w/m-K, a coefficient of thermal expansion below about 5 ppm/° C., and an elastic modulus below about 15 MSI, and more particularly has a thermal conductivity of less than about 0.2 w/m-K, a coefficient of thermal expansion below about 4 ppm/° C., and an elastic modulus below about 10 MSI.

It is still another and/or alternative non-limiting object of the present invention to provide a method for manufacturing a structural, thermally-insulating composite material that comprises: a) mixing pore-forming filler material in the form of shrinkable/curable microspheres and a thermosetting, curable polymer; b) molding and/or forming the mixed microspheres and polymer into a shape; and c) subsequently heat curing and pyrolization of the polymer material(s) to form the syntactic ceramic composite.

It is yet another and/or alternative non-limiting object of the present invention to provide a method for manufacturing a structural, thermally-insulating composite material that includes subsequent processing of the structural, thermally-insulating composite material with successive polymer impregnations and/or pyrolizations to increase density and/or strength.

It is still yet another and/or alternative non-limiting object of the present invention to provide a method for manufacturing a structural, thermally-insulating composite material that includes subsequent processing of the structural, thermally-insulating composite material with a stabilizing heat at or above the required operating temperatures.

These and other objects and advantages will become apparent to those skilled in the art upon reading and following the description taken together with the accompanying drawings.

BRIEF DESCRIPTION OF THE DRAWINGS

Reference may now be made to the drawing which illustrates a non-limiting embodiment that the invention may take in physical form and in certain parts and arrangement of parts wherein.

DETAILED DESCRIPTION OF THE INVENTION

Figure 1:
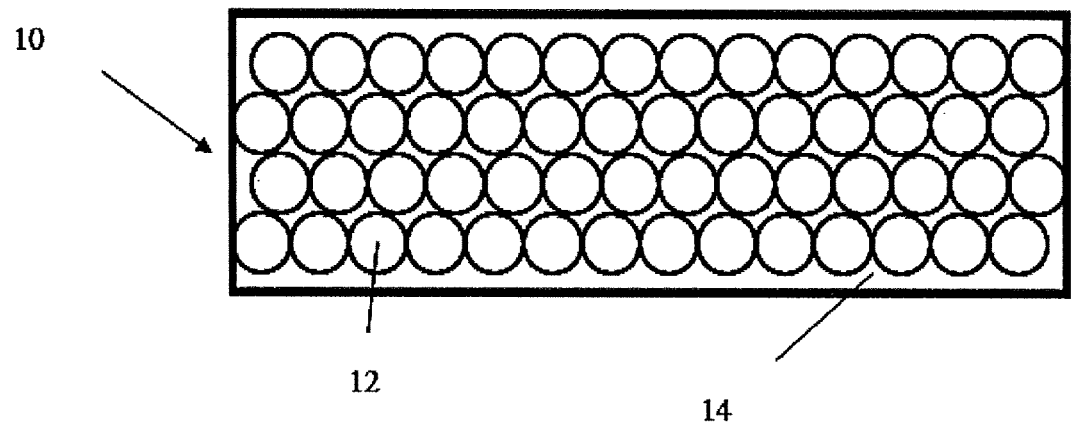
FIG. 1 is a side view of a cross section of a closed-cell foam insulator of the present invention in accordance with the present invention.
Figure 2:
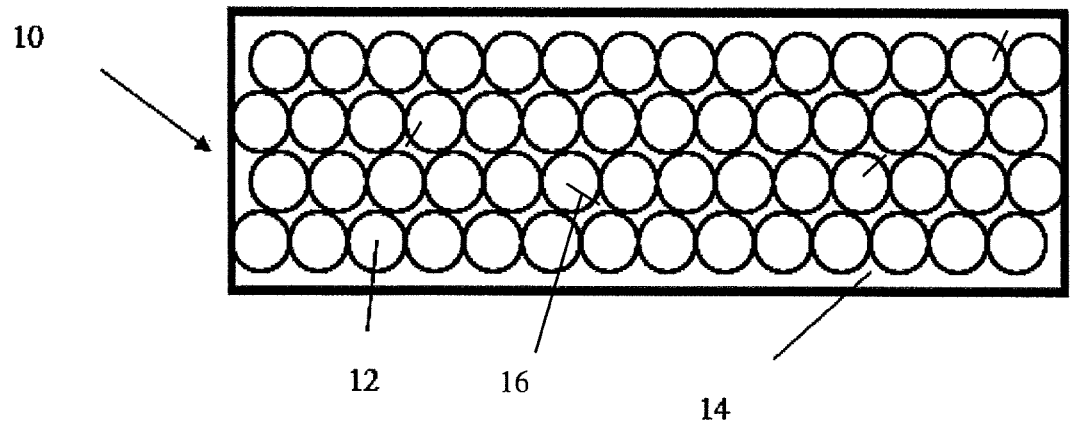
FIG. 2 is a side view of a cross section of a closed-cell foam insulator that includes non-shrinkable fillers in accordance with the present invention.

Referring now to the drawings wherein the showings are for the purpose of illustrating non-limiting embodiments of the invention only and not for the purpose of limiting same, there is shown in the FIG. 1 a cross section of a structural, thermally-insulating composite material in the form of a structural, thermally-insulating composite material 10 having individual matrix pores 12 formed from a pore-forming filler material distributed in a matrix material 14. FIG. 2 is a cross section of a structural, thermally-insulating composite material in the form of a structural, thermally-insulating composite material 10 having individual matrix pores 12 formed from a pore-forming filler material distributed in a matrix material 14 and non-shrinkable filler 16 in the matrix material.

The matrix material is curable polymer material that is shrinkable and can form a ceramic-type material after being subjected to pyrolization and/or carbonization. Non-limiting examples of the matrix material include polycarbosilanes, polysilazanes, and polyborosilazanes. Non-limiting specific examples of the matrix polymer are poly urea siloxane, polymethylsilsesquioxane, and polysilsesquioxanes.

The matrix pores 12 that are distributed throughout the matrix material 14 have a low thermal conductivity. The thermal conductivity of the matrix pores and the pore-forming filler material is less than the thermal conductivity of the matrix material.

When the matrix pores 12 are distributed in the matrix material 14, the overall thermal conductivity of the structural, thermally-insulating composite material 10 is significantly lower than that of the matrix material 14. Additionally, one advantage of the invention is that the matrix pores 12 and the matrix material 14 exhibit co-shrinkage upon processing at elevated temperatures. This co-shrinkage reduces post-processing stresses within the structural, thermally-insulating composite material 10.

The structural, thermally-insulating composite material 10 can have varying degrees of size, loading, and/or distribution. Matrix pore 12 size can range from several nanometers to hundreds of microns. The matrix pore 12 loading can range from less than 1 vol. % to 74 vol. %. The distribution of the matrix pores in the matrix material can be random, gradient, and/or uniform.

The structural, thermally-insulating composite material 10 can include a matrix material 14 made of polymer, ceramic, metal and/or any other sufficiently rigid and strong material. The matrix material can also or alternatively be formed from a precursor material that converts to a solid polymer, ceramic, and/or metal matrix system upon curing, pyrolization, carbonization and/or any other reaction mechanism. The structural, thermally-insulating composite material can optionally include non-shrinkable fillers 16 such as fibers, nanofibers, and/or other toughening and/or strengthening reinforcements.

The matrix pores 12 can be formed from microballoons of ceramic, metal, polymer, aerogel, and/or any material that exhibits co-shrinkage with the matrix material 14 throughout processing.

The matrix pores generally provide high strength and/or low-thermal conductivity. The matrix pores 12 can be entirely hollow and/or be formed by the inclusion and degradation of a ceramic, metal, polymer, and/or any material that degrades at high temperatures leaving closed-cell porosity.

The structural, thermally-insulating composite material 10 can be formed from low-density microspheres in a polymer-derived matrix material that exhibits co-shrinkage between the microspheres and polymer-derived matrix during processing.

One or more of the microspheres can optionally include shrinkable hollow microballoons and/or shrinkable low density aerogel particles. One or more of the shrinkable microspheres can include a preceramic polymer microballoon, phenolic resin microballoon, green or partially-cured aerogel, and/or a sinterable ceramic microballoon. The matrix polymer material can optionally be a thermosetting preceramic polymer. The matrix phase can be engineered to have lower shrinkage than the syntactic filler such that it can placed in compression upon curing. The matrix phase can be optionally engineered to have the same shrinkage as the syntactic filler so as to be close to zero residual stress after curing and pyrolization. The syntactic filler can have some shrinkage. Any shrinkage is generally less than the matrix material so as to restrain the shrinkage of the matrix phase. The structural, thermally-insulating composite material 10 can be manufactured by the steps of: a) mixing shrinkable/curable microspheres and a thermosetting, curable polymer; b) molding and/or forming the mixed microspheres and polymer into a shape; and c) subsequently heat curing and pyrolization of the polymer material(s) to form a syntactic ceramic composite. The syntactic ceramic composite can optionally be subsequently processed with successive polymer impregnations and/or pyrolizations to increase density and/or strength. The syntactic ceramic composite can undergo a stabilizing heat at or above the required operating temperatures.

The method can optionally include the step of a non-shrinkable filler being added to control matrix shrinkage. The method can optionally include the step of fibrous materials being added to provide higher strength and/or toughness. The non-shrinkable filler phase can optionally have at least one primary dimension (e.g., length) of less than 20% of the microsphere diameter, and typically less than 5% of the microsphere diameter.

EXAMPLES

Example 1

A structural, thermally-insulating composite material was formed of about 30 vol. % phenolic microballoons, about 20 vol. % of -325 mesh SiC powder and about 50 vol. % poly urea siloxane temperature curable resin. The microballoons had an average size of 120 μm. The microballoons had a shrinkage per unit volume of 50% during pyrolyzation. The SiC powder exhibited no shrinkage during pyrolization. The poly urea siloxane temperature curable resin has 40% shrinkage by unit volume during pyrolyzation. The components of the structural, thermally-insulating composite material were mixed together and placed into a Teflon™-lined steel cavity and heated at 200° C. for one hour to cure the structural, thermally-insulating composite material. The cured structural, thermally-insulating composite material had a density of 0.8 g/cc. The cured sample of structural, thermally-insulating composite material had the dimensions of 25×25×25 mm. The cured structural, thermally-insulating composite material was then pyrolyzed by increasing the temperature to 1500° C. for at least 14 hours. When the pyrolyzation of the structural, thermally-insulating composite material was complete, the sample had uniformly shrunk and no cracking was observed. The sample pyrolyzed had dimensions of 22×22×22 mm and had a density of 0.8 g/cc. The sample was then tested in compression and failed at above 37 Mpa at room temperature (e.g., 77° F.). The sample retained over 90% of its compression strength when tested at 900° C. and 80% of its compression strength when tested at 1200° C.

Example 2

A structural, thermally-insulating composite material was formed of about 30 vol. % phenolic microballoons, about 20 vol. % -325 mesh $B_4C$ powder and about 50 vol. % poly urea siloxane temperature-curable resin. The microballoons had an average size of 120 μm. The microballoons had a shrinkage per unit volume of 50% during pyrolyzation. The poly urea siloxane temperature-curable resin has 40% shrinkage by unit volume during pyrolyzation. The components of the structural, thermally-insulating composite material were mixed together and placed into a Teflon™-lined steel cavity and heated at 200° C. for one hour to cure the structural, thermally-insulating composite material. The $B_4C$ powder expanded about 110% of its original volume during the curing process. The cured structural, thermally-insulating composite material had a density of 0.77 g/cc. The cured sample of structural, thermally-insulating composite material had the dimensions of 25×25×25 mm. The cured structural, thermally-insulating composite material was then pyrolyzed by increasing the temperature to 900° C. for at least 14 hours. When the pyrolyzation of the structural, thermally-insulating composite material was complete, the sample had uniformly shrunk and no cracking was observed. The sample pyrolyzed had dimensions of 24×24×24 mm and had a density of 0.7 g/cc. The sample was then tested in compression and failed at above 50 Mpa at room temperature (e.g., 77° F.). The sample retained over 80% of its compression strength when tested at 900° C. and 30% of its compression strength when tested at 1200° C.

Example 3

A structural, thermally-insulating composite material was formed of about 30 vol. % alumina microballoons, about 20 vol. % -325 mesh SiC powder and about 50 vol. % poly urea siloxane temperature curable resin. The microballoons had an average size of 100 μm. The microballoons had essentially no shrinkage during pyrolyzation. The SiC powder exhibited no shrinkage during pyrolization. The poly urea siloxane temperature curable resin has 40% shrinkage by unit volume during pyrolyzation. The components of the structural, thermally-insulating composite material were mixed together and placed into a Teflon™-lined steel cavity and heated at 200° C. for one hour to cure the structural, thermally-insulating composite material. The cured structural, thermally-insulating composite material had a density of 0.7 g/cc. The cured sample of structural, thermally-insulating composite material had the dimensions of 25×25×25 mm. The cured structural, thermally-insulating composite material was then pyrolyzed by increasing the temperature to 1500° C. for at least 14 hours. When the pyrolyzation of the structural, thermally-insulating composite material was complete, the sample had uniformly uniformly shrunk and was broken and cracked around the microballoons as they resisted shrinkage. The sample had almost no mechanical integrity and could not be measured.

Example 4

A structural, thermally-insulating composite material formed of about 30 vol. % polyacrylonitrile PAN microballoons, about 20 vol. % of -325 mesh SiC powder and about 50 vol. % poly urea siloxane temperature curable resin. The microballoons had an average size of 300 μm. The microballoons had a shrinkage per unit volume of 55% during pyrolyzation. The SiC powder exhibited no shrinkage during pyrolization. The poly urea siloxane temperature-curable resin has 40% shrinkage by unit volume during pyrolyzation. The components of the structural, thermally-insulating composite material were mixed together and placed into Teflon™-lined steel cavity and heated at 200° C. for one hour to cure the structural, thermally-insulating composite material. The cured structural, thermally-insulating composite material had a density of 0.5 g/cc. The cured sample of structural, thermally-insulating composite material had the dimensions of 25×25×25 mm. The cured structural, thermally-insulating composite material was then pyrolyzed by increasing the temperature to 1500° C. for at least 14 hours. When the pyrolyzation of the structural, thermally-insulating composite material was complete, the sample had uniformly shrunk and no cracking was observed. The sample pyrolyzed had dimensions of 20×20×20 mm and had a density of 0.6 g/cc. The sample was then tested in compression and failed at above 30 Mpa at room temperature (e.g., 77° F.).

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A thermally-insulating composite material formed from a filler in a polymer matrix material, said filler including a shrinkable filler, said shrinkable filler exhibits co-shrinkage with said polymer matrix material during processing, said thermally-insulating composite material providing thermal-insulating protection in environments having a temperature up to 1600° C., said polymer matrix material including a thermosetting, curable polymer, said shrinkable filler including microspheres, said microspheres formed of a material that co-shrinks with said polymer matrix material to lower or eliminate stress during sintering, pyrolization, and/or curing of said polymer matrix material and the filler, at least a portion of said shrinkable filler forming matrix pores in said thermally-insulating composite material after the sintering, pyrolization, and/or curing of said polymer matrix material and said filler, said filler constituting 1-74 vol. % of said thermally-insulating composite material prior to the sintering, pyrolization, and/or curing of said polymer matrix material and said filler, said polymer matrix material constituting 20-99 vol. % of said thermally-insulating composite material prior to the sintering, pyrolization, and/or curing of said polymer matrix material and said filler, said thermally-insulating composite material having a lower thermal conductivity than said polymer matrix material said thermal conductivity of said polymer matrix material is greater than a thermal conductivity of said microspheres of said shrinkable filler, said polymer matrix material that forms a solid polymer and/or ceramic matrix system upon curing, pyrolization, and/or carbonization, said shrinkable filler formulated to co-shrink with said polymer matrix material during said curing and/or pyrolization of said mixture of said filler and said polymer matrix material, said polymer matrix material has a different shrinkage than said filler to restrain the amount of shrinkage said polymer matrix material during formation of said thermally-insulating composite material.

2. The composite material as defined in claim 1, wherein said matrix pores in said thermally-insulating composite material constitute about 1-74 vol. % of said thermally-insulating composite material.

3. The composite material as defined in claim 1, wherein said distribution of said matrix pores in said thermally-insulating composite material is generally uniform.

4. The composite material as defined in claim 1, wherein said filler includes non-shrinkable filler non-shrinkable fillers, said non-shrinkable fillers selected from the group consisting of fibers, whiskers, nanofibers, and nanotubes.

5. The composite material as defined in claim 4, wherein said non-shrinkable fillers have an average length that is less than an average diameter of said matrix pores.

6. The composite material as defined in claim 1, wherein said shrinkable filler includes microballoons of ceramic, metal, polymer, aerogel, phenolic resin, or combinations thereof.

7. The composite material as defined in claim 1, wherein said filler has a shrinkage that is less than said polymer matrix material.

8. The composite material as defined in claim 1, wherein said filler has a greater amount of shrinkage than said polymer matrix material.

9. The composite material as defined in claim 1, wherein at least a portion of said shrinkable fillers is formed of a material that partially or fully disintegrates during the curing or pyrolization of said polymer matrix material to form a plurality of said matrix pores that is partially or fully absent said microsphere after said polymer matrix material has substantially fully cured and pyrolized.

10. The composite material as defined in claim 1, wherein said composite material has a density below about 1.5 g/cc and a flexure and compressive strength exceeding about 5000 psig, and has a thermal conductivity of less than about 0.6 w/m-K, a coefficient of thermal expansion below about 5 ppm/° C., and an elastic modulus below about 15 MSI.

11. A thermally-insulating composite material formed from a filler in a polymer matrix material, said filler including a shrinkable filler, said shrinkable filler exhibits co-shrinkage with said polymer matrix material during processing, said polymer matrix material including a thermosetting, curable polymer, said shrinkable filler including microspheres, said microspheres formed of a material that co-shrinks with said polymer matrix material to lower or eliminate stress during sintering, pyrolization, and/or curing of said polymer matrix material and the filler, at least a portion of said shrinkable filler forming matrix pores in said thermally-insulating composite material after the sintering, pyrolization, and/or curing of said polymer matrix material and said filler, said shrinkable filler formulated to co-shrink with said polymer matrix material during said curing and/or pyrolization of said mixture of said filler and said polymer matrix material, said polymer matrix material has a different shrinkage than said filler to restrain the amount of shrinkage said polymer matrix material during formation of said thermally-insulating composite material.

12. The thermally-insulating composite material as defined in claim 11, wherein said shrinkable filler has a lower thermal conductivity than said polymer matrix material such that an overall thermal conductivity of said thermally-insulating composite material is lower than a thermal conductivity of said polymer matrix material.

13. The thermally-insulating composite material as defined in claim 11, wherein said polymer matrix material has a lower shrinkage than said shrinkable filler.

14. The thermally-insulating composite material as defined in claim 11, wherein said polymer matrix material has a greater shrinkage than said shrinkable filler.

15. The thermally-insulating composite material as defined in claim 11, wherein said shrinkable filler includes one or more materials selected from the group consisting of: 1) microballoons of ceramic, metal, polymer, aerogel, phenolic resin, or combinations thereof; 2) alumina microspheres; and 3) shrinkable low-density aerogel particles.

16. The thermally-insulating composite material as defined in claim 15, wherein one or more of said microspheres are selected from the group consisting of a preceramic polymer microballoon, a phenolic resin microballoon, a green or partially-cured aerogel, and a sinterable ceramic microballoon.

17. The thermally-insulating composite material as defined in claim 11, wherein a plurality of said microspheres partially or fully disintegrates during said sintering, pyrolizing, curing, or combinations thereof of said polymer matrix material to form a plurality of said matrix pores in said thermally-insulating composite material, a plurality of said matrix pores are partially or fully absent said microspheres.

18. The thermally-insulating composite material as defined in claim 11, wherein said matrix pores constitute about 1-74 vol. % of said thermally-insulating composite material.

19. The thermally-insulating composite material as defined in claim 11, wherein a distribution of said matrix pores in said thermally-insulating composite material is generally uniform.

20. The thermally-insulating composite material as defined in claim 11, wherein said filler includes non-shrinkable fillers, said non-shrinkable fillers selected from the group consisting of fibers, whiskers, nanofibers, and nanotubes.

21. The thermally-insulating composite material as defined in claim 20, wherein said non-shrinkable fillers have an average length that is less than an average diameter of said matrix pores.

22. The thermally-insulating composite material as defined in claim 11, wherein said thermally-insulating composite material has a density below about 1.5 g/cc and a flexure and compressive strength exceeding about 5000 psig.

23. The thermally-insulating composite material as defined in claim 1, wherein said thermally-insulating composite material has a thermal conductivity of less than about 0.6 w/m-K, a coefficient of thermal expansion below about 5 ppm/° C., and an elastic modulus below about 15 MSI.

24. A thermally-insulating composite material formed from a filler in a matrix material that has been subjected to sintering, pyrolization, and/or curing to form said thermally-insulating composite material, said thermally-insulating composite material providing thermal-insulating protection in environments having a temperature up to 1600° C., said filler including shrinkable filler, said shrinkable filler exhibits co-shrinkage with said matrix material during said sintering, pyrolization, and/or curing of said filler and said matrix material, said matrix material including a polymer, ceramic, and/or metal that upon curing, pyrolization, and/or carbonization forms a solid polymer, ceramic, and/or metal matrix system, said shrinkable filler including microspheres, said microspheres formed of a material that co-shrinks with said matrix material to lower or eliminate stress during sintering, pyrolization and/or curing of said matrix material and the filler, at least a portion of said shrinkable filler forming matrix pores in said thermally-insulating composite material after the sintering, pyrolization, and/or curing of said matrix material and said filler, said microspheres of said shrinkable filler having a thermal conductivity that is less than said derived matrix material such that an overall thermal conductivity of said thermally-insulating composite material is lower than a thermal conductivity of said derived matrix material, said thermal conductivity of said matrix material is greater than a thermal conductivity of said microspheres of said shrinkable filler, said filler constituting 1-74 vol. % of said thermally-insulating composite material prior to the sintering, pyrolization, and/or curing of said matrix material and said filler, said matrix material constituting 20-99 vol. % of said thermally-insulating composite material prior to the sintering, pyrolization, and/or curing of said matrix material and said filler, said microspheres co-shrinking with said matrix material during said sintering, curing and/or pyrolization of said mixture of matrix material and filler, said matrix material has a different amount of shrinkage than said filler to restrain the amount of shrinkage of said matrix material during formation of said thermally-insulating composite material, a plurality of said microspheres of said shrinkable filler partially or fully disintegrating during said sintering, curing and/or pyrolization of said mixture of matrix material and filler to form a plurality of matrix pores in said thermally-insulating composite material, a plurality of said microspheres of said shrinkable filler are partially or fully absent in said thermally-insulating composite after said matrix material and said filler have been subjected to said sintering, curing, and/or pyrolization, said matrix pores having a diameter of 3 nm to 500 μm, said matrix pores constitute about 25-74 vol. % of said thermally-insulating composite material, said distribution of said matrix pores in said thermally-insulating composite material is generally uniform, said thermally-insulating composite material has a density below about 1.5 g/cc.

25. The thermally-insulating composite material as defined in claim 24, wherein said thermally-insulating composite material has a thermal conductivity of less than about 0.6 w/m-K.

26. The thermally-insulating composite material as defined in claim 24, wherein said filler includes a non-shrinkable filler, said non-shrinkable filler selected from the group consisting of powder, fibers, whiskers, nanofibers, and nanotubes, said non-shrinkable filler constitutes 0.05-45 vol. % of said thermally-insulating composite material.

27. The thermally-insulating composite material as defined in claim 25, wherein said filler includes a non-shrinkable filler, said non-shrinkable filler selected from the group consisting of powder, fibers, whiskers, nanofibers, and nanotubes, said non-shrinkable filler constitutes 0.05-45 vol. % of said thermally-insulating composite material.

28. The thermally-insulating composite material as defined in claim 24, wherein said non-shrinkable filler includes fumed silica, silica, glass fiber, carbon fiber, carbon nanotubes, SiC, and/or $B_4C$.

29. The thermally-insulating composite material as defined in claim 27, wherein said non-shrinkable filler includes fumed silica, silica, glass fiber, carbon fiber, carbon nanotubes, SiC, and/or $B_4C$.

30. The thermally-insulating composite material as defined in claim 24, wherein said microspheres include microballoons of ceramic, metal, polymer, aerogel and/or phenolic resin.

31. The thermally-insulating composite material as defined in claim 29, wherein said microspheres include microballoons of ceramic, metal, polymer, aerogel and/or phenolic resin.

32. The thermally-insulating composite material as defined in claim 24, wherein said matrix material is at least partially formed of one or more materials selected from the group consisting of a) a ceramic material, and b) a material that at least partially converts to a ceramic material upon being exposed to heat.

33. The thermally-insulating composite material as defined in claim 31, wherein said matrix material is at least partially formed of one or more materials selected from the group consisting of a) a ceramic material, and b) a material that at least partially converts to a ceramic material upon being exposed to heat.

* * * * *